US008375521B1

(12) United States Patent
Caron

(10) Patent No.: US 8,375,521 B1
(45) Date of Patent: Feb. 19, 2013

(54) SANITARY DOOR HANDLE COVER

(76) Inventor: Andy S. Caron, Strathroy (CA)

( * ) Notice: Subject to any disclaimer, the term of this patent is extended or adjusted under 35 U.S.C. 154(b) by 334 days.

(21) Appl. No.: 12/870,167

(22) Filed: Aug. 27, 2010

(51) Int. Cl.
*A47J 45/10* (2006.01)

(52) U.S. Cl. ................................ 16/435; 16/904; 16/431

(58) Field of Classification Search .................... 16/435, 16/904, 422, 110.1, 431, 905; 422/292, 294; 379/452; 15/104.92; 150/155
See application file for complete search history.

(56) References Cited

U.S. PATENT DOCUMENTS

| | | | | |
|---|---|---|---|---|
| 1,491,780 | A | 4/1924 | Abbott | |
| 4,600,620 | A * | 7/1986 | Lloyd et al. | 15/104.93 |
| 4,832,942 | A * | 5/1989 | Crace | 428/71 |
| 4,856,140 | A | 8/1989 | Visco et al. | |
| 5,713,615 | A | 2/1998 | Tsai | |
| 6,546,594 | B1 | 4/2003 | Wills | |
| 6,863,960 | B2 * | 3/2005 | Curro et al. | 428/166 |
| 7,862,877 | B2 * | 1/2011 | Balzano | 428/72 |
| 8,276,626 | B2 * | 10/2012 | Balbosa | 16/435 |
| 2004/0266546 | A1 * | 12/2004 | Huang | 473/300 |
| 2009/0130005 | A1 * | 5/2009 | Balzano | 422/292 |

* cited by examiner

*Primary Examiner* — Jeffrey O Brien

(57) ABSTRACT

A sanitary door handle cover which includes a strip having five layers including a first layer formed of absorbent, breathable material, an absorbent second layer, a sanitizing third layer with pockets containing sanitizing solution which is absorbed by the first, second, and fourth layers upon the application of pressure to the strip, an absorbent fourth layer, and an adhesive fifth layer which removably adheres to a door handle or door knob. A rectangular strip is applied to a mid-section of a door handle, while a bilaterally symmetrical trapezoid-shaped strip is applied to a grip surface of a door knob.

5 Claims, 3 Drawing Sheets

SANITARY DOOR HANDLE COVER

BACKGROUND OF THE INVENTION

Various types of sanitary wraps for surfaces, such as doors, are known in the prior art. However, what is needed is a sanitary door handle cover which includes a strip having five layers including a first layer formed of absorbent, breathable material, an absorbent second layer, a sanitizing third layer with pockets containing sanitizing solution which is absorbed by the first, second, and fourth layers upon the application of pressure to the strip, an absorbent fourth layer, and an adhesive fifth layer which removably adheres to a door handle or door knob.

FIELD OF THE INVENTION

The present invention relates to sanitary wraps for surfaces, and more particularly, to a sanitary door handle cover which includes a strip having five layers including a first layer formed of absorbent, breathable material, an absorbent second layer, a sanitizing third layer with pockets containing sanitizing solution which is absorbed by the first, second, and fourth layers upon the application of pressure to the strip, an absorbent fourth layer, and an adhesive fifth layer which removably adheres to a door handle or door knob.

SUMMARY OF THE INVENTION

The general purpose of the present sanitary door handle cover, described subsequently in greater detail, is to provide a sanitary door handle cover which has many novel features that result in a sanitary door handle cover which is not anticipated, rendered obvious, suggested, or even implied by prior art, either alone or in combination thereof.

To accomplish this, the present sanitary door handle cover includes at least one layered strip. Each strip includes five layers including a first layer, a second layer, a third layer, a fourth layer, a fifth layer and also a backing. The breathable outer first layer of the strip is formed of a breathable, absorbent material. The absorbent second layer of the strip is conjoined to a back side of the entire first layer. The third layer of the strip is conjoined to a rearward side of the entire second layer. The third layer has a plurality of spaced apart pockets therein. Each pocket contains a sanitizing solution. The absorbent fourth layer of the strip is conjoined to a posterior side of the entire third layer. The adhesive inside fifth layer of the strip is conjoined to a hind side of the entire fourth layer. A backing is removably adhered to a rear side of the fifth layer. The sanitizing solution disposed within the third layer pockets is absorbed by each of the first layer, the second layer, and the fourth layer upon the application of pressure to the strip. The strip may be rectangular to removably adhere the strip fifth layer to a substantial portion of a midsection of a C-shaped door handle. The strip may alternatively be bilaterally symmetrical trapezoid-shaped to removably adhere the strip to an entire grip surface of a door knob.

To utilize the sanitary door handle cover, the user begins by removing the backing from the rear side of the fifth layer. Use continues by wrapping and adhering the fifth layer of either a rectangular strip or a bilaterally symmetrical trapezoid-shaped strip around the midsection of the C-shaped door handle or an entire grip surface of a door knob, respectively. This is followed by gripping and placing pressure on the strip and then releasing the sanitizing solution from the third layer pockets into each of the second layer and the fourth layer by gripping and placing pressure on the strip.

The instant sanitary door handle cover reduces the likelihood of transferring diseases and germs from person to person by covering door handles and door knobs with a sanitary cover covered with a strip that contains sanitizing solution which is released therein upon the placement of pressure on the strip, thereby eradicating germs and bacteria as people touch the strip while pulling on the door handle or turning the door knob. The present cover also protects users who fail to wash their hands when leaving a washroom from encountering and transferring diseases and germs.

The present sanitary door handle cover is easily installed and removed due to the adhesive layer of the strip. The strip may be replaced every 24 hours or as often as needed, depending on the amount and level of use. The present cover may be used in hospitals, restaurant washrooms and workrooms, public washrooms, such as those in schools, work buildings and plants, stores, public transportation doors and handles, service centers, and tourist centers and attractions—in short, any public or private building with door knobs and handles for which protection from germs and diseases is desired. The present cover provides peace of mind to a user in that the cover eliminates the need to worry about whether the other individuals have failed to wash their hands and thus, are capable of transferring diseases or germs to the user. The present sanitary door handle cover is relatively inexpensive and reduces the amount of manhours lost due to illness from diseases and germs contracted by formerly having unprotected and unsanitized door handles, and door knobs.

Thus has been broadly outlined the more important features of the present sanitary door handle cover so that the detailed description thereof that follows may be to better understood and in order that the present contribution to the art may be better appreciated.

Numerous objects, features and advantages of the present sanitary door handle cover will be readily apparent to those of ordinary skill in the art upon reading the following detailed description of presently preferred, but nonetheless illustrative, examples of the present sanitary door handle cover when taken in conjunction with the accompanying drawings. In this respect, before explaining the current examples of the present sanitary door handle cover in detail, it is to be understood that the invention is not limited in its application to the details of construction and arrangements of the components set forth in the following description or illustration. The invention is capable of other examples and of being practiced and carried out in various ways. It is also to be understood that the phraseology and terminology employed herein are for purposes of description and should not be regarded as limiting.

Those skilled in the art will appreciate that the conception upon which this disclosure is based may readily be utilized as a basis for the design of other structures, methods and systems for carrying out the several purposes of the sanitary door handle cover. It is therefore important that the claims be regarded as including such equivalent constructions insofar as they do not depart from the spirit and scope of the present invention.

Objects of the present sanitary door handle cover, along with various novel features that characterize the invention are particularly pointed out in the claims forming a part of this disclosure. For better understanding of the sanitary door handle cover, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
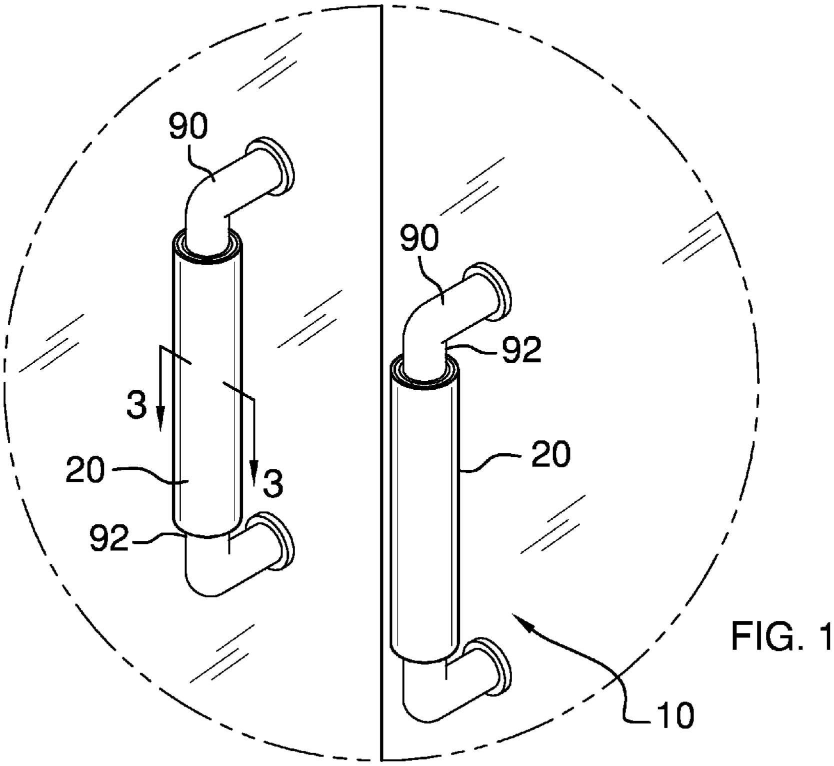
FIG. 1 is an isometric in-use view.
Figure 2:
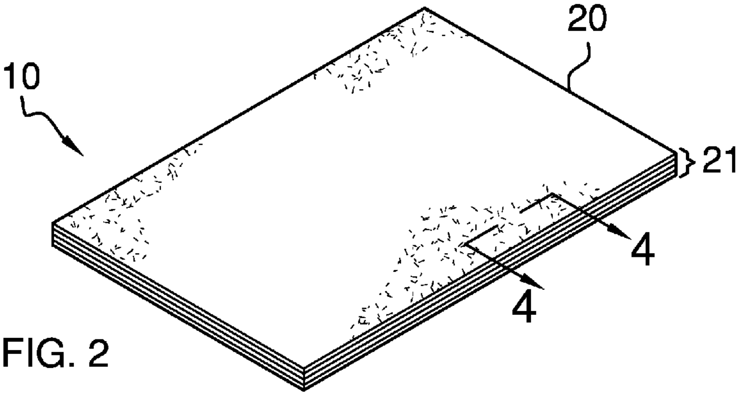
FIG. 2 is an isometric view.
Figure 3:
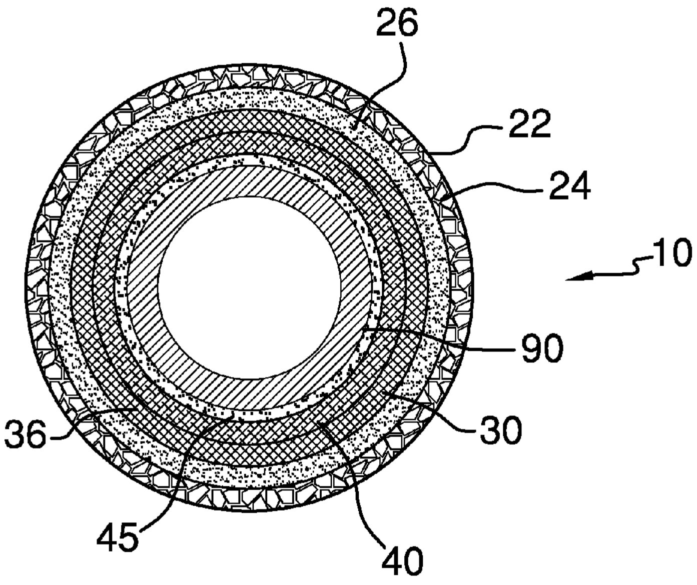
FIG. 3 is a cross section view taken along line 3-3 of FIG. 1.
Figure 4:
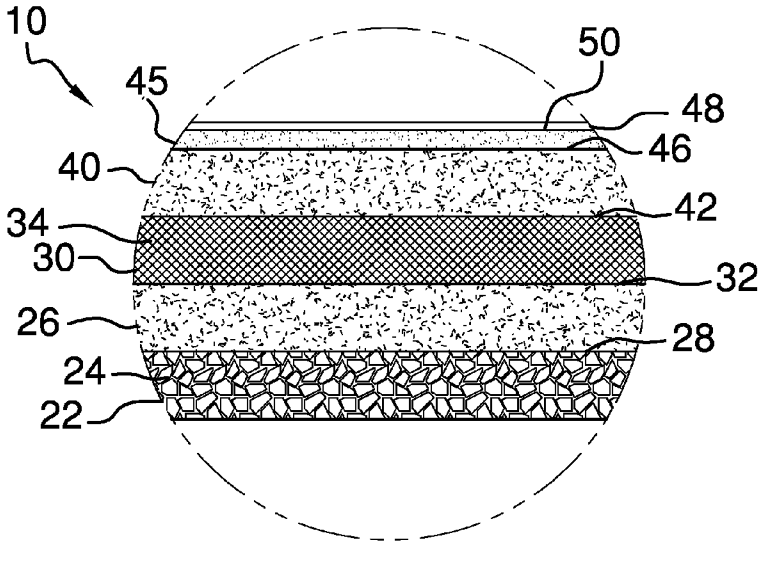
FIG. 4 is a cross section view taken along line 4-4 of FIG. 2.
Figure 5:
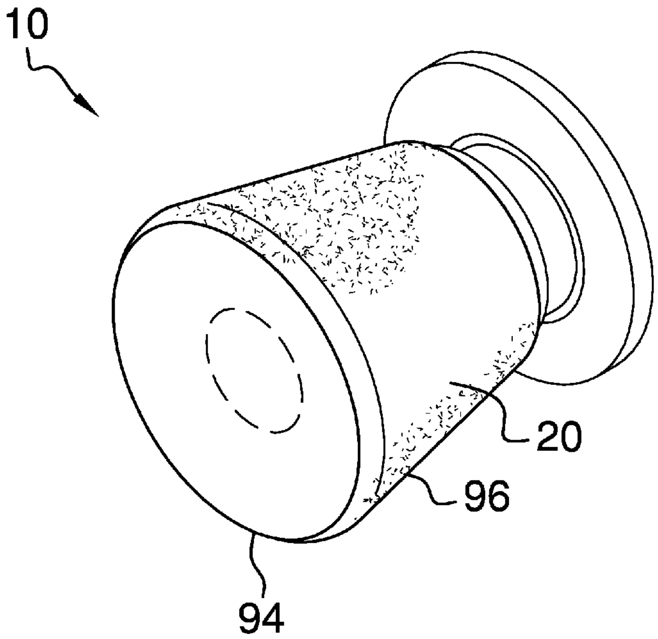
FIG. 5 is an in-use isometric view of a trapezoidal shaped strip.

With reference now to the drawings, and in particular FIGS. 1 through 5 thereof, example of the instant sanitary door handle cover employing the principles and concepts of the present sanitary door handle cover and generally designated by the reference number 10 will be described.

Referring to FIGS. 1 through 5 a preferred embodiment of the present sanitary door handle cover 10 is illustrated. The sanitary door handle cover includes at least one layered strip 20. Each strip 20 includes five layers 21. A breathable outer first layer 22 of the strip 20 is formed of an absorbent and breathable material 24. An absorbent second layer 26 of the strip 20 is conjoined to a back side 28 of the entire first layer 22. A third layer 30 of the strip 20 is conjoined to a rearward side 32 of the entire second layer 26. The third layer 30 has a plurality of spaced-apart pockets 36 therein. Each pocket 36 contains a sanitizing solution 34. An absorbent fourth layer 40 of the strip 20 is conjoined to a posterior side 42 of the entire third layer 30. An adhesive inside fifth layer 45 of the strip 20 is conjoined to a hind side 46 of the entire fourth layer 40. A backing 48 is removably adhered to a rear side 50 of the fifth layer 45.

The sanitizing solution 34 of the third layer 30 is absorbed by each of the first layer 22, the second layer 26, and the fourth layer 40 upon the application of pressure to the strip 20. The strip 20 may be rectangular to removably adhere the strip 20 fifth layer 45 to a substantial portion of a midsection 92 of a C-shaped door handle 90. The strip 20 may alternatively be bilaterally symmetrical trapezoid-shaped to removably adhere the strip 20 to an entire grip surface 96 of a door knob 94.

Use:

To utilize the sanitary door handle cover 10, the user begins by removing the backing 48 from the rear side 50 of the fifth layer 45. Use continues by wrapping and adhering the fifth layer 45 of either a rectangular strip 20 or a bilaterally symmetrical trapezoid-shaped strip 20 around the midsection 92 of the C-shaped door handle 90 or an entire grip surface 96 of a door knob 94, respectively. This is followed by gripping and placing pressure on the strip 20 and then releasing the sanitizing solution 34 from the third layer 30 pockets 36 into each of the first layer 22, the second layer 26, and the fourth layer 40 by gripping and placing pressure on the strip 20. The strip 20 may be removed and replaced every 24 hours or as often as needed, depending upon the amount of and level of use.

With respect to the above description then, it is to be realized that the optimum dimensional relationships for the parts of the present sanitary door handle cover to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Directional terms such as “front”, “back”, “in”, “out”, “downward”, “upper”, “lower”, and the like may have been used in the description. These terms are applicable to the examples shown and described in conjunction with the drawings. These terms are merely used for the purpose of description in connection with the drawings and do not necessarily apply to the position in which the present invention may be used.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A sanitary door handle cover comprising:
- at least one layered strip;
- a breathable outer first layer of the strip comprising a breathable and absorbent material;
- an absorbent second layer of the strip conjoined to a back side of the entire first layer;
- a third layer of the strip conjoined to a rearward side of the entire second layer, the third layer having a plurality of spaced apart pockets therein;
- a sanitizing solution disposed within each of the third layer pockets;
- an absorbent fourth layer of the strip conjoined to a posterior side of the entire third layer;
- an adhesive inside fifth layer of the strip conjoined to a hind side of the entire fourth layer;
- a backing removably adhered to a rear side of the fifth layer;
- wherein the sanitizing solution disposed within the third layer pockets is absorbed by each of the first layer, the second layer and the fourth layer upon the application of pressure to the strip.

2. The sanitary door handle cover of claim 1 wherein the layered strip is rectangular; and
- wherein the strip fifth layer removably adheres to a substantial portion of a midsection of a C-shaped door handle.

3. The sanitary door handle cover of claim 1 wherein the layered strip is bilaterally symmetrical trapezoid-shaped; and
- wherein the strip removably attaches to an entire grip surface of a door knob.

4. A method of utilizing the sanitary door handle cover of claim 2 wherein the method comprises:
- removing the backing from the rear side of the fifth layer;
- wrapping and adhering the fifth layer around the midsection of the C-shaped door handle;
- gripping and placing pressure on the strip; and
- releasing the sanitizing solution disposed within the third layer pockets into each of the first layer, the second layer, and the fourth layer by gripping and placing pressure on the strip.

5. A method of utilizing the sanitary door handle cover of claim 3 wherein the method comprises:
- removing the backing from the rear side of the fifth layer;
- wrapping and adhering the fifth layer around the grip surface of the door knob;
- gripping and placing pressure on the strip; and
- releasing the sanitizing solution disposed within the third layer pockets into each of the first layer, the second layer and the fourth layer by gripping and placing pressure on the strip.

* * * * *